United States Patent [19]

Smith

[11] 4,105,642
[45] Aug. 8, 1978

[54] PREPARATION OF CARBODIIMIDE IN PRESENCE OF PHOSPHOLENE CATALYSTS

[75] Inventor: Curtis P. Smith, Cheshire, Conn.

[73] Assignee: The Upjohn Company, Kalamazoo, Mich.

[21] Appl. No.: 846,973

[22] Filed: Oct. 31, 1977

Related U.S. Application Data

[62] Division of Ser. No. 764,375, Jan. 31, 1977, Pat. No. 4,068,055.

[51] Int. Cl.² ............... C08F 8/18; C08F 8/24; C08F 8/40; C08F 12/32
[52] U.S. Cl. .................... 528/51; 526/27; 526/43; 526/46; 526/57; 526/275; 528/69
[58] Field of Search ............ 260/77.5 AB, 77.5 AC; 526/21, 27, 275

[56] References Cited

U.S. PATENT DOCUMENTS

| | | | |
|---|---|---|---|
| 3,767,708 | 10/1973 | Smith | 260/77.5 AC |
| 3,855,186 | 12/1974 | Moedritzer | 526/275 |
| 3,855,352 | 12/1974 | Moedritzer | 526/275 |
| 4,067,820 | 1/1978 | Wagner et al. | 260/77.5 AB |

*Primary Examiner*—William F. Hamrock

*Attorney, Agent, or Firm*—Denis A. Firth; John Kekich

[57] ABSTRACT

Modified polystyrenes are described which are catalysts for the conversion of organic isocyanates to the corresponding carbodiimides. The modified polystyrenes are characterized by the presence of recurring units of the formula:

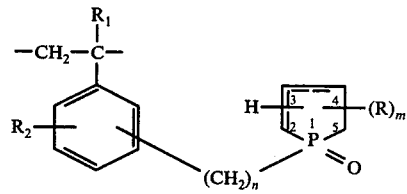

wherein the broken lines in the phospholene nucleus indicate a double bond located between the carbon atom at position 3 and one of the carbon atoms at positions 2 and 4, the H atom is attached to whichever carbon atom at positions 2 and 4 is not part of said double bond, R is halogen, alkoxy ($C_{1-6}$), phenoxy, hydrocarbyl ($C_{1-18}$), halohydrocarbyl ($C_{1-18}$), $m = 0$–3; $n = 0, 1$; $R_1$ is hydrogen or methyl; and $R_2$ is hydrocarbyl free from substituents reactive with isocyanate.

2 Claims, No Drawings

PREPARATION OF CARBODIIMIDE IN PRESENCE OF PHOSPHOLENE CATALYSTS

This is a division of application Ser. No. 764,375, filed Jan. 31, 1977, now U.S. Pat. No. 4,068,055.

BACKGROUND OF THE INVENTION

1. Field of the Invention

This invention relates to modified polystyrene polymers and is more particularly concerned with phospholene-substituted polystyrenes and with processes for their preparation and processes for their use as catalysts for converting isocyanates to carbodiimides.

2. Description of the Prior Art

It is known that certain phospholene oxides are catalysts for the conversion of isocyanates to carbodiimides; see U.S. Pat. No. 2,853,473. It has also recently been disclosed (see German Offenlegenschrift No. 2,504,334; published after the present invention was made) that certain phospholane-phosphonic acid salts of aminomodified polystyrenes can be employed as catalysts for the same reaction.

We have now found that certain phospholene-substituted polystyrenes are highly effective catalysts for the conversion of organic isocyanates to the corresponding carbodiimides and are possessed of marked advantages when employed for this purpose.

SUMMARY OF THE INVENTION

This invention comprises polymers characterized by the presence therein of a recurring unit having the formula:

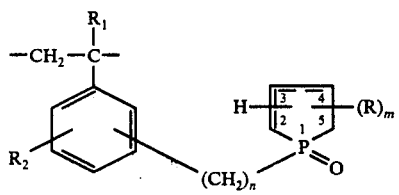

(I)

wherein the broken lines in the phospholene nucleus indicate a double bond located between the carbon atom at position 3 and one of the carbon atoms at positions 2 and 4, the H atom is attached to whichever carbon atom at positions 2 and 4 is not part of said double bond, R is a substituent selected from the class consisting of halogen, alkoxy from 1 to 6 carbon atoms, inclusive, phenoxy, hydrocarbyl from 1 to 18 carbon atoms, inclusive, and halohydrocarbyl from 1 to 18 carbon atoms, inclusive, $m$ is a whole number from 0 to 3, $n$ is 0 or 1, $R_1$ is selected from the class consisting of hydrogen and methyl, and $R_2$ represents hydrocarbyl said hydrocarbyl being free of substituents which are reactive with isocyanate.

The term "alkoxy from 1 to 6 carbon atoms" is inclusive of methoxy, ethoxy, propoxy, butoxy, pentyloxy, hexyloxy, and isomeric forms thereof. The term "hydrocarbyl" means the monovalent radical obtained by removing one hydrogen atom from the parent hydrocarbon having the stated number of carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like, including isomeric forms thereof; and cycloalkenyl such as cyclopentenyl, cyclohexenyl, cycloheptenyl, cyclooctenyl, and like, including isomeric forms thereof.

The term "halohydrocarbyl" means hydrocarbyl of the stated carbon atom content having one or more halo substituents. The hydrocarbyl group $R_2$ is free from substituents which are reactive with isocyanate groups. Illustrative of such substituents are halo, i.e. chloro, bromo, fluoro, and iodo; alkoxy as defined supra; alkylmercapto from 1 to 6 carbon atoms, inclusive, such as methylmercapto, ethylmercapto, propylmercapto, butyl-mercapto, pentylmercapto, hexylmercapto and isomeric forms thereof; and cyano.

The invention also comprises processes for the preparation of the above polymers and a process for the conversion of organic isocyanates to carbodiimides.

DETAILED DESCRIPTION OF THE INVENTION

The polymers of the invention, which are characterized by the presence of the recurring group (I), are obtained by chemical modification of at least some of the recurring units of a polystyrene or by first introducing the appropriate phospholene substituent into the benzene ring of a styrene monomer and then polymerizing or copolymerizing the monomer.

Illustratively, the polymers of the invention can be prepared from the corresponding polystyrene using the following sequence of steps. The starting polystyrene is converted to the corresponding nuclear brominated or chloromethylated derivative using the procedures described by Relles et al, JACS, 96, 6469, 1974. The bromination of the polystyrene is accomplished by reacting the latter with bromine in the presence of a catalyst such as boron trifluoride. The chloromethylation is achieved by reacting the polystyrene with chloromethyl methyl ether in the presence of boron trifluoride. By appropriate choice of the molar proportions of bromine or chloromethyl methyl ether to polystyrene it is possible to introduce a bromo or chloromethyl group into any given proportion or all of the benzene nuclei in the polystyrene.

The intermediate bromo or chloromethylated polystyrene so obtained is then reacted with the appropriate phospholene halide of the formula:

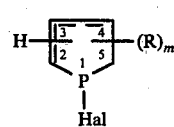

(II)

wherein R and $m$, the dotted lines and H have the significance hereinbefore detailed and Hal is chloro, bromo, or iodo. The reaction is carried out in the presence of lithium using the conditions described by Relles et al, supra, for the analogous condensation of the bromo and chloromethylated polystyrenes with chlorodiphenylphosphine. Illustratively, the reactants are brought together in the presence of a solvent such as tetrahydrofuran, dimethylformamide, dimethylacetamide, tetramethylenesulfone, cyclohexane, benzene, toluene and the like, and the mixture is maintained under an inert atmosphere such as nitrogen while an excess of metallic lithium, advantageously in the form of newly extruded wire, is added. The reaction is generally conducted at ambient temperature (20° – 25° C) but higher temperatures, e.g. temperatures up to the reflux temperature of the solvent employed, can be used if desired.

Depending upon the nature of the polystyrene employed as starting material and upon the solvents employed, the above reactions are carried out with the polystyrene or polystyrene derivative in solution or present as an insoluble solid phase. Thus, where the starting material is a polystyrene which has not been crosslinked by copolymerization with, for example, a minor amount of divinylbenzene, the polystyrene is soluble in polar solvents and the above reactions can be carried out in solution. The final product is isolated by, for example, precipitation by the addition of an aliphatic alcohol such as methanol or like solvents in which the product is insoluble. On the other hand, where the starting polystyrene is not soluble to any substantial degree in polar or other solvents, the polystyrene is generally reacted, in the form of beads, powdered material, or other forms having relatively small particle size, in suspension with appropriate agitation.

The phospholene-substituted polystyrenes thus obtained are then subjected to oxidation using hydrogen peroxide or like oxidizing agents to obtain the final polymers having the recurring unit (I). The reaction can be carried out conveniently by suspending the phospholene-substituted polystyrene in a polar solvent, such as that set forth above, and adding the oxidizing agent thereto. The reaction is advantageously carried out at ambient temperatures but higher temperatures (up to about 70° C) can be employed, if desired.

Any of the commonly available forms of polystyrene can be employed in preparing the polymers of the invention using the above series of reactions. The commonly available polystyrenes include the homopolymer of styrene itself, the copolymer of styrene and a minor amount of divinylbenzene (generally 2 percent by weight or less), the homopolymers of vinyltoluene, α-methylstyrene, and chlorostyrene as well as the copolymers formed from two or more of the aforementioned monomers. For a detailed description of these various forms of polystyrene and methods for their preparation see, for example, Encyclopedia or Polymer Science and Technology, Vol. 13, p. 128 et seq., John Wiley and Sons, New York, 1970.

As mentioned above, it is possible to adjust the proportion of the nuclear benzene rings in the starting polystyrene which are subjected to bromine or chloromethyl substitution, followed by reaction with the phospholene halide (II), so that from about 10 percent to about 100 percent of the recurring units in the resulting polymer having the formula (I) above. When less than 100 percent of the recurring units in the resulting polymer have the formula (I), the remainder of the recurring units in said polymer will obviously be those corresponding to the starting polystyrene. It will also be apparent that, by subjecting the intermediate bromo or chloromethylated polystyrene to reaction with less than the stoichiometric amount of one phospholene halide (II), and then subjecting the product so obtained to reaction with a second and different phospholene halide (II), it is possible to obtain a polymer of the invention which contains two different phospholene residues in the molecule. Similarly, polymers having three or more different phospholene residues in the molecule can be obtained by extension of the above reaction.

The phospholene halides (II) which are employed in the preparation of the polymers of the invention are known compounds which are described, together with processes for their preparation, in U.S. Pat. No. 3,803,225.

In an alternative method of preparing the polymers of the invention having the recurring unit (I) a monomer of the formula

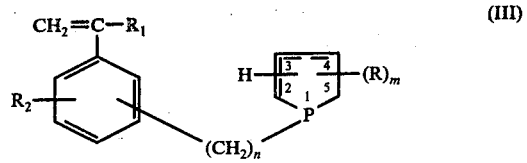

wherein R, $R_1$, $R_2$, n, m, H and the dotted lines have the significance hereinbefore defined, is homopolymerized or copolymerized with styrene, α-methylstyrene, chlorostyrene, or vinyltoluene using methods well-known in the art, supra. The resulting phospholene-substituted polystyrene is then subjected to oxidation, using the procedure described above, to form the corresponding oxide.

The above monomers having the formula (III) are prepared by reaction of the appropriate nuclear brominated or chloromethylated styrene monomer and the appropriate phospholene halide (II) using the reaction conditions described above for the corresponding reaction involving the brominated or chloromethylated polystyrene.

In a further aspect of the present invention there is provided an improved process for the preparation of organic carbodiimides by heating the corresponding organic isocyanate in the presence of a carbodiimide-forming catalyst, the improvement lying in the use as catalyst of a polymer having the recurring unit (I) described above. The process can be applied to conversion of any organic isocyanate and it has the advantage over previously employed catalysts that the polymer catalyst always remains in a phase separate from the isocyanate and the resulting carbodiimide and can be readily separated from the latter at the end of the reaction. Further, the use of the polymeric catalysts is readily adaptable to continuous type process in which the organic isocyanate to be treated, optionally as a solution in an appropriate organic solvent, is passed through a supported bed or column of catalyst. The hold up time in the column is adjusted so that complete conversion, or any desired degree of conversion, can be achieved in a single passage through the column.

Any of the known organic mono or polyisocyanates can be converted to the corresponding carbodiimide using the novel polymeric catalysts of the invention. Illustrative of such isocyanates are methyl, ethyl, isopropyl, butyl, hexyl, octyl, octadecyl, allyl, 2-pentyl, cyclopentyl, cyclohexyl, 1-cyclopentenyl, 2-cyclohetenyl, benzyl, phenethyl, 3-phenylpropyl, benzhydryl, 2-naphthylmethyl, naphtyl, phenyl, p-tolyl, o-tolyl, 3-nitrophenyl, 4-methoxyphenyl, 4-allyloxyphenyl, 3,4-xylyl, 2-chlorophenyl, decahydronaphthyl, trifluoromethyl, 2-chloroethyl and 3-nitropropyl mono isocyanates; 2,4-toluene, 2,6-toluene, hexamethylene, 4,4'-biphenylene, and 3,3'-dimethoxy-biphenylene-4,4'- diisocyanates, methylenebis(phenyl isocyanate) and the like such as those listed in Siefkin Ann. 562, 122–135, 1949.

In carrying out the conversion of the organic isocyanate to the corresponding carbodiimide, the organic isocyanate and the polymeric catalyst are brought together in the proportion of about 0.1 part by weight to about 10 parts by weight of catalyst per 100 parts of isocyanate. The reaction is advantageously carried out at elevated temperatures of the order of about 70° C to about 200° C. The progress of the reaction can be followed readily by measuring the evolution of carbon dioxide which is eliminated in the reaction. Cessation of evolution of the gas generally indicates completion of the reaction. The resulting carbodiimide is then readily separated from the catalyst. The separation is facilitated by carrying out the reaction in the presence of an organic solvent in which starting isocyanate and the resulting carbodiimide are soluble. At the end of the carbodiimide forming reaction it is merely necessary to filter the catalyst from the reaction product. The catalyst can be reused repeatedly without losing activity.

The carbodiimides which are prepared in accordance with this aspect of the process of the invention are known compounds which are useful in preventing ageing and hydrolysis of elastomers; see, for example, U.S. Pat. Nos. 3,297,795 and 3,378,517.

The following examples describe the manner and process of making and using the invention and set forth the best mode contemplated by the inventors of carrying out the invention but are not to be construed as limiting.

EXAMPLE I

A. The procedure of Relles et al., supra, for the chloromethylation of polystyrene was repeated exactly as described. The polystyrene employed as starting material was 2 percent divinylbenzene cross-linked polystyrene (200–400 mesh; Eastman Kodak). By weight gain the chloromethylated product was determined to have a total of 94.5 percent of the benzene nuclei in the polymer chloromethylated.

B. A suspension of 18 g. (0.11 mole recurring unit) of the chloromethylated polystyrene (prepared as described above) in 400 ml. of tetrahydrofuran was stirred for 2 hours and then a total of 29.6 g. (0.22 mole) of 1-chloro-3-methyl-3-phospholene in 200 ml. of tetrahydrofuran was added slowly with stirring, followed by 3.6 g. (0.52 g. atom) of lithium wire cut into ⅛ inch lengths. The mixture was cooled in an ice bath during the addition of the lithium. The resulting mixture was then stirred at room temperature (circa 20° C) for a further 1 hour before being filtered. The solid so isolated was washed successively with tetrahydrofuran, methylene chloride, methanol and methylene chloride before being dried in an oven. There was thus obtained a phospholene-substituted polystyrene characterized by the following recurring unit:

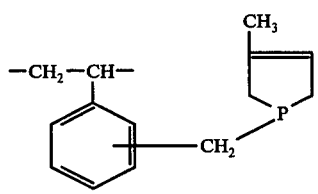

C. A suspension of 30 g. of the above polymer in 100 ml. of benzene was stirred and a total of 17 g. (0.15 mole) of 30 percent v/v of hydrogen peroxide was added with cooling in an ice-bath. When the addition was approximately one-half complete, 50 ml. of acetone was added to the reaction mixture to increase miscibility. After the addition was complete, the mixture was stirred for a further 1 hour before being filtered. The solid so isolated was suspended in 100 ml. of benzene and subjected to azeotropic distillation to remove the water. The dry suspension was filtered and the solid so isolated was washed successively with methanol, methylene chloride, methanol and methylene chloride before being dried in vacuo. There was thus obtained 25.7 g. of a polymer characterized by a recurring unit of the formula:

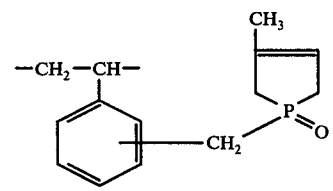

and having the following elemental analysis:
calcd. for $(C_{14}H_{17}OP)_n$: C, 72.41; H, 7.32; P, 13.36. Found: C, 64.26; H, 6.46; P, 11.16.

EXAMPLE 2

A. The procedure of Relles et al, supra, for the bromination of benzene was repeated exactly as described. The polystyrene employed as starting material was 2 percent divinylbenzene cross-linked polystyrene (200–400 mesh: Eastman-Kodak). The brominated product was found to contain 42.98 percent by weight of bromine indicating that 98.4 percent of the benzene nuclei in the polymer contained a bromine atom.

B. Using the procedure described in Example 1, part B, but replacing the chloromethylated polystyrene there used by an equivalent amount of the brominated polystyrene prepared as described above, there was obtained a phospholene-substituted polystyrene having the recurring unit

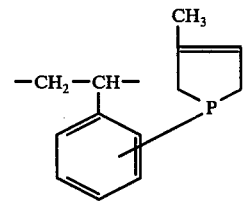

C. Using the procedure described in Example 1, part C, the above polystyrene was oxidized to give the polymer having the recurring unit of the formula:

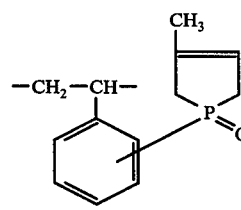

EXAMPLE 3

Using the procedure described in Example 1, but replacing the 1-chloro-3-methyl-3-phospholene employed in Step B by 1-chloro-3-methyl-2-phospholene, 1-chloro-3,4-dimethyl-3-phospholene, 1-chloro-3-phospholene, 1-bromo-3-phenyl-2-phospholene, and 1-chloro-3-ethyl-4-methyl-3phospholene, there are obtained the corresponding phospholene-1-oxide-substituted polystyrenes of the invention.

EXAMPLE 4

A mixture of 23.8 g. of phenylisocyanate and 0.46 g. of the modified polystyrene prepared as described in Example 2, part C, was heated at circa 160° C with stirring. Carbon dioxide was evolved in a steady stream. After heating for approximately one hour, the reaction mixture was filtered and infrared analysis of an aliquot showed characteristic absorption bands corresponding to some unchanged isocyanate, carbodiimide and uretodinedione-imine. The recovered catalyst was then heated with stirring at 155° C with a further charge of 23.8 g. of phenyl isocyanate for approximately 90 minutes during which time carbon dioxide was evolved steadily. The resulting product was filtered and an aliquot of the filtrate again showed characteristic infrared absorption bands corresponding to isocyanate, carbodiimide and uretidinedione-imine.

EXAMPLE 5

To a mixture of 4.86 g. (0.2 mole) of magnesium and 50 ml. of anhydrous tetrahydrofuran was added a solution of 1 ml. of ethylbromide in 20 ml. of anhydrous tetrahydrofuran. The mixture was stirred and the temperature maintained at about 50° to 55° C by controlled addition of a solution of 19.6 g. (0.14 mole) of p-chlorostyrene in 50 ml. of anhydrous tetrahydrofuran. The addition was complete in 30 minutes. The resulting Grignard solution was then stirred while a solution of 17.5 g. of 1-chloro-3-methyl-3-phospholene in 100 ml. of anhydrous tetrahydrofuran was added slowly with stirring at 0° to 10° C under nitrogen. The resulting mixture was stirred for a short period at room temperature (20° C) and then poured into a solution of 33 g. of ammonium chloride in 200 ml. of cold water. The product was allowed to stand overnight at room temperature before separating the organic layer and extracting the aqueous layer with tetrahydrofuran. The combined organic layer and washings were dried over anhydrous sodium sulfate, filtered and evaporated to dryness in stages. The residue was distilled to obtain 7.1 g. of 1-(p-vinylphenyl)-3-methyl-3-phospholene having a boiling point of 96° to 98° C at 0.2 mm.

This product, on allowing to stand (initially under nitrogen) for 60 days, homopolymerized spontaneously to form the polystyrene having the recurring unit

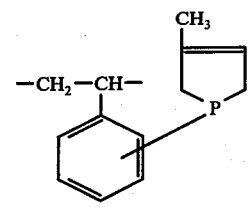

which was then oxidized as described in Example 1, part C.

I claim:

1. In a process for the preparation of a carbodiimide by heating the appropriate organic isocyanate in the presence of a catalyst, the improvement which comprises employing as said catalyst a polymer characterized by the presence therein of a recurring unit having the formula:

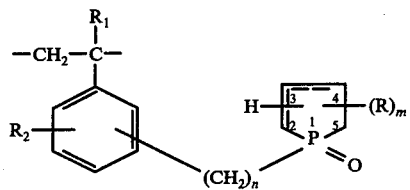

wherein the broken lines in the phospholene nucleus indicate a double bond located between the carbon atom at position 3 and one of the carbon atoms at positions 2 and 4, the H atom is attached to whichever carbon atom at positions 2 and 4 is not part of said double bond, R is a substituent selected from the class consisting of halogen, alkoxy from 1 to 6 carbon atoms, inclusive, phenoxy, hydrocarbyl from 1 to 18 carbon atoms, inclusive, and halohydrocarbyl from 1 to 18 carbon atoms, inclusive, $m$ is a whole number from 0 to 3, $n$ is 0 or 1 and $RS_1$ is selected from the class consisting of hydrogen and methyl and $R_2$ represents hydrocarbyl said hydrocarbyl being free of substituents which are reactive with isocyanate.

2. A process according to claim 1 wherein said catalyst is a polymer having a recurring unit of the formula:

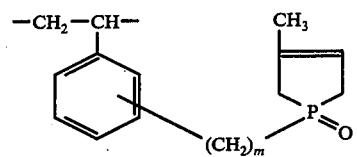

wherein $m$ is 0 or 1.

* * * * *

UNITED STATES PATENT OFFICE
CERTIFICATE OF CORRECTION

Patent No. 4,105,642      Dated August 8, 1978

Inventor(s) Curtis P. Smith

It is certified that error appears in the above-identified patent and that said Letters Patent are hereby corrected as shown below:

Column 3, line 48:          Should read:

Encyclopedia or             Encyclopedia of

Column 3, line 57:          Should read:

having                      have

Column 4, lines 61 and 62:  Should read:

2-cyclohetenyl              2-cycloheptenyl

Column 8, claim 1, line 42: Should read $RS_1$                      $R_1$

Signed and Sealed this

Thirteenth Day of March 1979

[SEAL]

Attest:

RUTH C. MASON  
Attesting Officer

DONALD W. BANNER  
Commissioner of Patents and Trademarks